United States Patent [19]

Nyunoya

[11] 3,881,780

[45] May 6, 1975

[54] BRAKE HYDRAULIC PRESSURE CONTROL SYSTEM FOR VEHICLES

[75] Inventor: Mizuo Nyunoya, Toyota, Japan

[73] Assignee: Aisin Seiki Kabushiki Kaisha

[22] Filed: Apr. 30, 1973

[21] Appl. No.: 355,324

[30] Foreign Application Priority Data

May 13, 1972 Japan............... 47-047463

[52] U.S. Cl.......... 303/21 F; 188/181 A; 303/21 AF
[51] Int. Cl............................................. B60t 8/08
[58] Field of Search.......... 303/21 F, 21 AF, 61–63, 303/68–69, 6 C; 188/181 A

[56] References Cited
UNITED STATES PATENTS

| | | | |
|---|---|---|---|
| 3,486,800 | 12/1969 | Ayers, Jr............... | 303/6 C |
| 3,495,882 | 2/1970 | Stelzer................ | 303/6 C |
| 3,695,732 | 10/1972 | Stelzer................ | 303/21 F |
| 3,729,236 | 4/1973 | Okamo et al. ......... | 303/6 C |

Primary Examiner—Trygve M. Blix
Assistant Examiner—D. C. Butler
Attorney, Agent, or Firm—Pierce, Scheffler & Parker

[57] ABSTRACT

A brake actuating hydraulic pressure control system for a vehicle comprising a pressure control valve device arranged within a brake hydraulic circuit to reduce the pressure of the brake actuating fluid relative to the master cylinder pressure after the master cylinder pressure exceeds a predetermined value, the pressure control valve device including a valve member cooperating a piston for on-off controlling the circuit, and a skid control device for relieving the pressure of the brake fluid upon the occurrence of a substantial wheel skidding condition; the skid control device including a plunger normally holding the valve member of the pressure control valve device into a given position and a control piston effecting the movement of the plunger to displace the valve member into its close position upon the occurrence of the skidding condition.

6 Claims, 4 Drawing Figures

BRAKE HYDRAULIC PRESSURE CONTROL SYSTEM FOR VEHICLES

BACKGROUND OF THE INVENTION

This invention relates to a brake actuating hydraulic pressure control system for a vehicle, and more particulary to a brake hydraulic pressure control system having a pressure control valve device and a skid control device for a vehicle.

Conventionally, pressure control valve devices have been proposed which decrease its out put pressure relative to its input pressure, and vice versa, after the input pressure exceeds a predetermined value. Devices which vary the predetermined value in response to a load condition of the vehicle have been also proposed as load sensing valve devices. While it is well-known that skid control devices act so as to reduce the effective braking hydraulic pressure upon the occurrence of a substantial wheel skidding condition.

Such conventional system is designed and arranged in which the pressure control valve device or the load sensing valve device and the skid control device are arranged independently in construction within the brake hydraulic circuit. This results in large in size because the respective devices will require the corresponding parts and, therefore, it it necessary to provide an enlarged space wherein the respective devices will be accommodated. This also results in comparatively high in cost.

SUMMARY OF THE INVENTION

Therefore, it is an object of the present invention to provide an improved brake hydraulic pressure control system for obviating the various drawbacks mentioned above.

It is another object of the present invention to provide an improved brake hydraulic pressure control system wherein a pressure control valve device includes a valve member for on-off controlling a hydraulic communication between input and output pressures and the same valve member is operated by a skid control device to interrupt said hydraulic communication.

It is a further object of the present invention to provide an improved brake hydraulic pressure control system wherein the valve member for controlling the brake hydraulic circuit is urged in its given position by the skid control device which is normally positioned and maintained in its inoperative position.

It is a still further object of the present invention to provide an improved brake hydraulic pressure control system wherein the skid control device comprises a piston and a plunger, the plunger being urged by the piston in its inoperative position when no skid instructive signal is applied to the skid control device whereby maintaining the valve member of the pressure control valve device in its given position, and the plunger being operated so as to interrupt the brake hydraulic circuit and being moved to reduce the effective brake pressure upon the occurrence of the skid.

It is another object of the present invention to provide an improved brake hydraulic pressure control system wherein the skid control device including the piston and the plunger is maintained in its inoperative position by a pressurized hydraulic fluid.

It is still another object of the present invention to provide an improved brake hydraulic pressure control system wherein the valve member controls the brake hydraulic circuit in response to movement of a spring biased stepped piston which includes a small effective area exposed to the input pressure and a large effective area exposed to the output pressure, the valve member comprising a stem portion which is normally urged in the given position by the plunger of the skid control device.

It is a further object of the present invention to provide an improved brake hydraulic pressure control system which is simple in construction and comparatively low in cost.

BRIEF DESCRIPTION OF THE DRAWINGS

These and further objects, feautures and attendant advantages of the present invention will be more fully appreciated as the same becomes better understood from the following detailed description when considered in connection with the accompanying drawings wherein like reference characters designate like or corresponding parts throughout the several views, and in which.

DETAILED DESCRIPTION OF THE INVENTION

Figure 1:
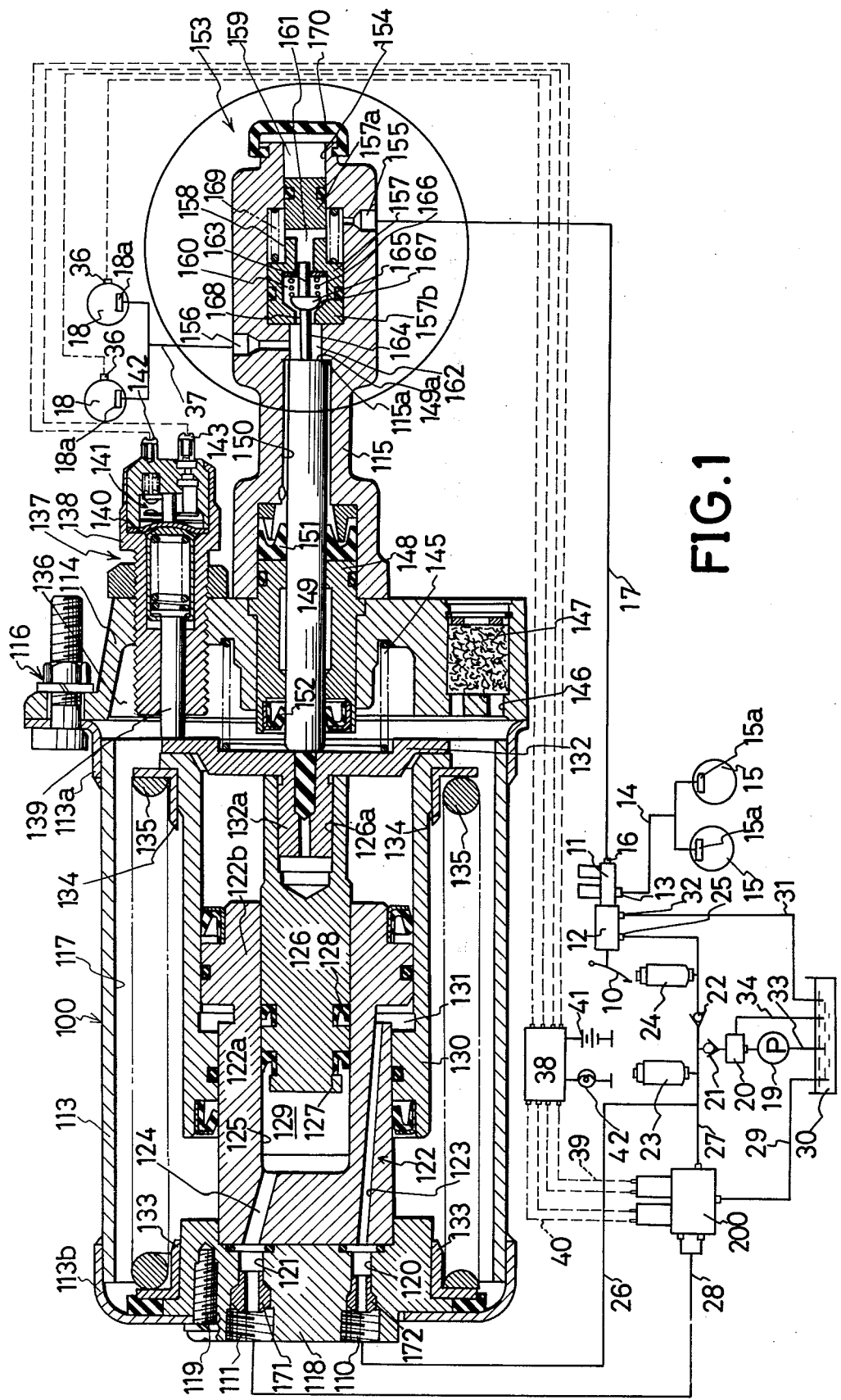
FIG. 1 is a cross-sectional view, with a brake system in diagram, of a brake pressure control mechanism showing one embodiment of the present invention.
Figure 3:
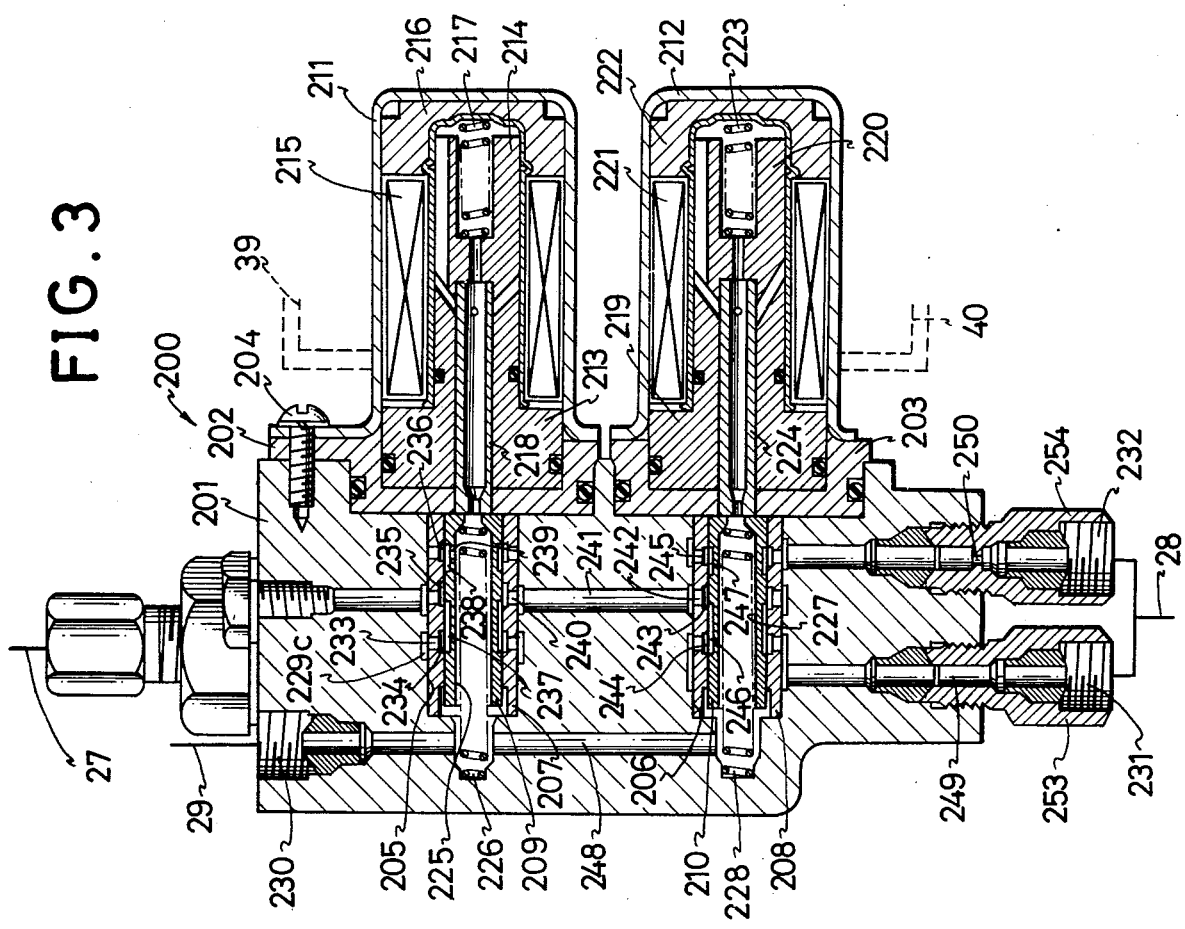
FIG. 3 is a cross-sectional view taken along the arrow A—A of FIG. 2.
Figure 2:
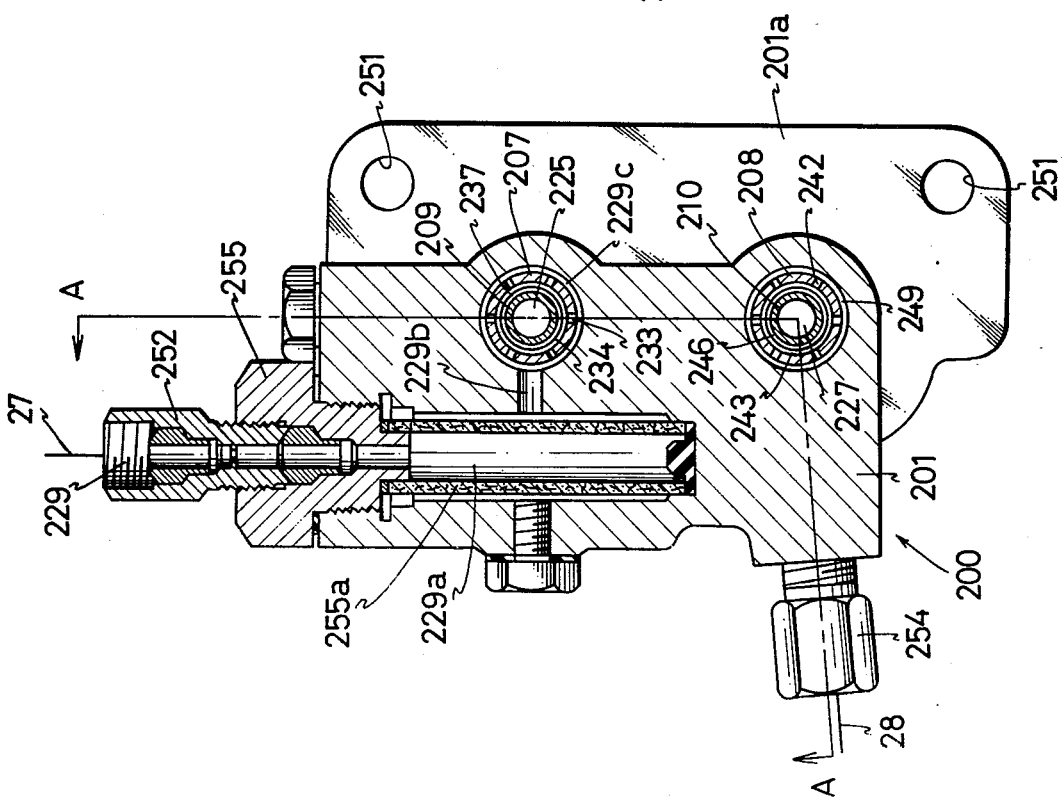
FIG. 2 is a cross-sectional view of the change-over valve assembly of the system illustrated in FIG. 1.

Referring now to FIGS. 1 to 3 wherein the first embodiment of the present invention is shown, a brake pedal 10 associates with a dual master cylinder 11 through a hydraulic brake booster 12. The master cylinder 11 is connected to cylinders 15a, 15a of the brakes on front wheels 15, 15 via a port 13 and a conduit 14 and is also connected to cylinders 18a, 18a of the brakes on rear wheels 18, 18 via a port 16, a conduit 17, a pressure control valve device 153 described hereinafter in detail, and a conduit 37. A pump 19 driven by a vehicle engine, not shown, is connected to a reservoir 30 via a conduit 33 to deliver the pressurized hydraulic fluid to a pair of accumulators 23 and 24 through an unloader valve 20 and check valves 21 and 22. The unloader valve 20 has a return conduit 34 connected to the reservoir 30 so that the hydraulic pressure from the pump 19 is returned to the reservoir 30 when the hydraulic pressure therefrom exceeds a predetermined value. Thus predetermined hydraulic pressures will be accumulated in the accumulators 23 and 24, respectively. One accumulator 24 is connected to a port 25 of the brake booster 12 while the other accumulator 23 is connected to a skid control device 100 through a conduit 26 and through a conduit 27, a change-over valve assembly 200 and a conduit 28. The change-over valve assembly 200 is also connected to the reservoir 30 via a conduit 29. An outlet port 32 of the brake booster 12 has a conduit 31 connected thereto which forms a return line to the reservoir 30.

A computer means 38 is electrically connected to sensors 36, 36 for the rear wheels 18, 18 to thereby sense a substantial wheel skid condition. Thus the computer 38 delivers through conductors 39 and 40 instructive signals to the change-over valve assembly 200 for causing the change-over valve assembly 200 to actuate. A numeral 41 is a battery. An alarming lamp 42 is connected to the computer 38 and is actuated in response to the actuation of an alarm device 137 attached to the skid control device 100.

The skid control device 100 consists of three parts having first, second and third housings 113, 114 and 115. The first housing 113 having a cylinder 117 is secured at its one end to the second housing 114 through bolt means 116 and a cover member 113a. The other end of the first housing 113 has a plug body 118 secured thereto through bolt means 119 and a cover member 113b. The plug body 118 is formed with a pair of ports 110 and 111 which are connected to the conduits 26 and 28, respectively. Secured to the plug body 118 is a stationary cylinder 122 which comprises two different diameter portions 122a and 122b. The cylinder 122 has a recess 125 in which a control piston 126 with seal members 127 and 128 is slidably mounted. A hydraulic chamber 129 defined thus within the recess 125 by the piston 126 normally receives the pressurized hydraulic fluid via a passage 124 formed in the cylinder 122, a passage 121 formed in the plug 118 having a seat member 171 and the port 111, whereby the piston 126 is urged in its illustrated position. An emergency piston 130 having a stepped bore is slidably mounted on the outside periphery of the cylinder 122 thereby defining a hydraulic chamber 131. A spring 135 is inserted between the plug body 118 and the piston 130 through retainers 133 and 134 to bias the piston 130 in the right direction. The hydraulic chamber 131 is connected to the port 110 via a passage 123 formed in the cylinder 122 and a passage 120 formed in the plug 118 having a seat member 172 so that the pressurized hydraulic fluid within the chamber 131 normally urges and holds the emergency piston 130 in the extreme left position in opposition to the biasing force of the spring 135. A supplementary piston 132 has a projection 132a fitted into a recess 126a of the piston 126 and thus both pistons 126 and 132 actuate as one piece. A spring 145 is inserted between the second housing 114 and the supplementary piston 132 for assisting the return movements of the pistons 126 and 132. A plunger 149 is slidably supported by a stationary guide member 148 disposed in the housings 114 and 115 and is normally held by the piston 132 in its illustrated inoperative position wherein a right end 149a of the plunger 149 is contacted with a shoulder 115a of the housing 115. The housing 115 has a bore 150 which functions as a variable volume chamber during the actuation of the skid control device 100, as described hereinafter. Numerals 151 and 152 denote seal members. The alarm device 137 comprises a plug 138 threaded through the second housing 114, a spring biased plunger 139, a resilient member 140, a switch 141 having a pair of contacts and electric terminals 142 and 143 associated with the switch 141. The plunger 139 extends through the plug 138 and a space 136 within the second housing 114 to the piston 132 so that the plunger 139 is normally held in its illustrated position. Thus, the switch 141 associates with the relative movement between the plunger 139 and the piston 132 through a snap action of the resilient member 140 and, therefore, the alarm device 137 causes the lamp 42 to light on through the computer 38 when the skid control device 100 do not operate in spite of the skid condition. The second housing 114 is formed with a bore 146 in which an air filter 147 is arranged.

The pressure control valve device 153 illustrated by a circle in FIG. 1 comprises the housing 115 which also forms the third housing of the skid control device 100. The housing 115 has a stepped cylinder 154 and is formed with inlet and outlet ports 155 and 156 which are connected, respectively, to the conduits 17 and 37. A stepped piston 157 having small and large diameter portions 157a and 157b is slidably mounted in the stepped cylinder 154 to define three chambers 158, 159 and 162. Thus the stepped piston 157 is provided with an effective output pressure receiving area at its large diameter portion 157b which is subjected the output pressure in the hydraulic chamber 162 to urge the piston 157 in a right direction and the stepped piston 157 is also provided with an effective input pressure receiving area corresponding to the difference area between the large and small portions 157b 157a. The effective input pressure receiving area is subjected to the input pressure in the hydraulic chamber 158 to urge the piston 157 in a left direction. A right end of the small diameter portion 157a of the piston 157 is exposed to atmospheric air in the chamber 159. Both chambers 158 and 162 are connected to each other through a passage 161, a chamber 160 and a passage 168 formed, respectively, in the piston 157. Disposed within the chamber 160 is a valve member 163 which comprises a stem 164 and a valve head 165. A spring 166 biases the valve member 163 in a left direction so that the valve member 163 is held in its given position in which the stem 164 of the valve member 163 engages with the plunger 149 of the skid control device 100 which is in its normal and illustrated position. The piston 157 is biased leftwardly by a spring 169 and thus the valve head 165 of the valve member 163 is unseated from a valve seat portion 167 formed in the piston 157 to open the passage 168 in inoperative condition of the system. The numeral 170 denotes a dust cover.

In FIGS. 2 and 3, the construction of the changeover valve assembly 200 is now described in detail. The assembly 200 comprises first, second and third housings 201, 202 and 203 secured to one another by bolts 204 together with cover members 211 and 212. The first housing 201 has two cylinders 205 and 206 in which inlet and outlet port members 207 and 208 are fitted, respecitvely. The member 207 has passages 233, 240, 234, 235 and 236 and the member 208 has passages 242, 243, 244 and 245, as best shown in FIG. 3. Pistons 209 and 210 having cylinders 225 and 227 are slidably mounted in the members 207 and 208, respectively, the piston 209 comprising annular grooves 237 and 238 and a drain port 239 and the piston 210 comprising annular grooves 246 and 247, as best shown in FIG. 3. These pistons 209 and 210 are biased by the biasing forces of springs 226 and 228 in their right directions and thus the pressurized hydraulic fluid in the accumulator 23 is normally transmitted to the chamber 129 of the skid control device 100 via passages 27, 229, 229a, 229b, 229c, 233, 234, 237, 235, 240, 241, 242, 243, 246, 244, 249, 231, 28, 111, 121 and 124. Disposed between the second housing 202 and the cover 211 is a solenoid coil 215 which is electrically connected to the computer 38 by the conductor 39. A moving core 214 is disposed in the coil 215 between stationary members 213 and 216 and associates with a plunger 218 movably disposed in the member 213. The core 214 and the plunger 218 are moved leftwardly by energization of the coil 215 and, therefore, the piston 209 is moved in the same direction against the biasing force of the spring 226. Thus the hydraulic communication between the accumulator 23 and the chamber 129 is closed and the chamber 129 is connected to the reservoir 30 via passages 124, 121, 111, 28, 231, 249, 244, 246, 243, 242, 241, 240, 235, 238, 239, 248, 230 and 29. A spring 217 is inserted for preventing the rattling of the core 214. A further solenoid coil 221 is disposed between the third housing 203 and the cover 212 and is electrically connected to the computor 38 by the conductor 40. A moving core 220 and a plunger 224 are disposed between stationary members 219 and 222 and the energization of the coil 221 moves the core 220 and the plunger 224 leftwardly. Thus the piston 210 is moved leftwardly so that said hydraulic line between the passages 241 and 28 is closed and the passage 241 connects to the passage 28 via passages 242, 243, 247, 245, 250, 232. A spring 223 is for preventing the rattling of the core 220. The effective diameter of the passage 249 is larger than that of the passage 250. A plug 252 formed with the port 229 is threaded in a member 255 which is in turn threaded in the housing 201. Numerals 253 and 254 are plugs for ports 231 and 232, respectively. An extending portion 201a of the first housing 201 has a plurality of holes 251 for securing the change-over valve assembly 200 to the vehicle body, not shown, by bolts, not shown. A numeral 255a is a filter.

In operation, in the normal running condition of the vehicle wherein the computer 38 generates no instructive signal, the pressurized hydraulic fluid in the accumulator 23 is transmitted to the chamber 129 through the change-over valve assembly 200 on one hand and is transmitted to the chamber 131 on the other hand. Thus, the pistons 126 and 132 and the plunger 149 are held in their illustrated and normal positions, respectively, but the piston 130 is moved and held by the pressurized fluid in the chamber 131 in its extreme left position. Therefore, the plunger 149 urges the valve member 163 in its unseated position, as viewed in FIG. 1. When the brake pedal 10 is now depressed, the brake booster 12 is actuated in a conventional manner and thus the hydraulic pressure generated in one chamber of the dual master cylinder 11 is communicated to the cylinders 15a, 15a of the front wheel brakes via the conduit 14 while the hydraulic pressure generated in the other chamber of the dual master cylinder 11 is communicated to the cylinders 18a, 18a of the rear wheel brakes via the conduit 17, the pressure control valve device 153 and the conduit 37. During the initial brake operation, the input pressure of the device 153 is transmitted directly to the rear cylinders 18a, 18a via the port 155, the chamber 158, the passage 161, the chamber 160, the passage 168, the chamber 162 and the port 156. During the initial brake action, the wheel brake cylinders of both sets of front and rear wheels will be thus actuated with increasing pressure as the brake pedal 10 is pressed harder. In this stage, the spring 169 holds the stepped piston 157 to the left and the valve member 163 is retained in the open condition illustrated here in which it engages the plunger 149. The piston 157 has the effective surface area $S_1$ on the left-hand side of the diameter portion 157b which is exposed to the hydraulic pressure $P_1$ in the chamber 162 and thus there is a hydraulic force $(S_1P_1)$ to urge the piston 157 to the right. The piston 157 also has the effective surface area on the right-hand side of the diameter portion 157b which is exposed to the hydraulic pressure $P_2$ in the chamber 158. Since the last effective area corresponds to the difference area $(S_1-S_2)$ between the cross-sectional areas $S_1$ and $S_2$ of the large and small diameter portions 157b and 157a of the piston 157, the piston 157 is urged by a force $P_2(S_1-S_2) \times F$ in a left direction where $F$ is a biasing force of the spring 169. When the master cylinder pressure reaches a predetermined pressure, the force $(S_1P_1)$ overcomes the force $P_2(S_1-S_2) \times F$ to cause the piston 157 to shift in the right direction. Thus the hydraulic communication between the valve head 165 and the valve seat 167 between the chambers 158 and 162 is interrupted. Thereafter, the master cylinder pressure is further increased, and the increased pressure will act on the effective area $(S_1-S_2)$ of the piston 157 against the force keeping the valve closed so that the piston 157 is moved leftwardly to reopen the passage 168. Thus closing and opening of the passage 168 is repeated thereafter and thus the device 153 causes a rise in the output pressure in the chamber 162 at a lower rate, relative to the increase in the input pressure in the chamber 158. During the normal brake operation mentioned above, the skid control device 100 is held and maintained in its inoperative position because of the introduction of the pressurized fluid into the chamber 129 of the skid control device 100.

The operation of the skid control device 100 will now be described. The sensors 18a, 18a generate electric signals proportional to the rotational speeds of wheels 18, 18. The computer 38 receives the electric signals from the sensors so that it senses the substantial wheel skid condition, for example responding to a rapid change in rotational speed of the wheel resulting from the excessive deceleration of the wheel. Upon the occurrence of the skid condition, the computer 38 delivers the instructive signal to energize the solenoid coil 215 of the change-over valve assembly 200. This moves the moving core 214 and the plunger 218 to the left and thus the piston 209 is moved leftwardly against the biasing force of the spring 226. Accordingly, the hydraulic communication established hitherto between the passages 233 and 240 is interrupted and the passage 240 is now communicated with the hole 239. This results in that the pressurized hydraulic fluid in the chamber 129 of the skid control device 100 is drained out to the reservoir 30 via the hydraulic line 124, 121, 28, 231, 249, 244, 246, 243, 242, 241, 240, 238, 239, 248, 230 and 29. Therefore, the pistons 126 and 132 and the plunger 149 are moved leftwardly due to the hydraulic pressure in the chamber 162 and the biasing force of the spring 145. The valve member 163 biased by the spring 166 follows the leftward movement of the plunger 149 so that the valve head 165 seats against the valve seat 167 of the piston 157 to interrupt the fluid communication between the chambers 158 and 164 after the predetermined movement of the plunger 149. Since the plunger 149 is further moved leftwardly due to the hydraulic pressure in the chamber 164, the effective volume of the hydraulic circuit between the valving portion at 165 and 167 and the rear wheel cylinders 18a, 18a is increased corresponding to the movement of the plunger 149. Thus the rear brake pressure on the rear wheels will be substantially reduced. Even when the master cylinder pressure exceeds the predetermined pressure which causes the pressure control valve 153 to actuate under normal brake operation, the valve member 163 is held in its closed position due to the hydraulic pressure in the chamber 160 when the skid control device 100 actuates. In other wards, the pressure control valve device 153 ceases its function as long as the skid control device 100 actuates. Thus the skid condition is eliminated and the computer 38 responds to deenergize the coil 215 whereby the elements of the change-over valve assembly 200 is returned in their original positions as illustrated in FIG. 2. The pressurized hydraulic fluid in the accumulator 23 is again transmitted to the chamber 129 of the skid control device 100 via the hydraulic line 27, 229, 233, 234, 237, 235, 240, 241, 242, 243, 246, 244, 249, 231 and 28. The pressurized hydraulic fluid in the chamber 129 urges the elements of the skid control device 100 in their original positions so as to increase the brake pressure on the rear wheels. Thus the normal brake action will be again attained. If the master cylinder pressure is higher than the predetermined value when the skid control device 100 returns in its original position, the pressure control valve device 153 immediately begins its operation mentioned above. With the increased pressure reapplied to the rear wheel cylinders 18a, 18a, the skid condition may reoccur and the reduction in the pressure on the rear cylinders and the reapplication of the pressure to the rear cylinders thereafter may result in the occurrence of a series of alternate cycles to prevent the actual wheel skid.

The speeds of the reduction and reapplication of the pressure on the rear cylinders through the skid control device 100 will be varied by the energization of the coil 221. The coil 221 is energized through the conductor 40 by the computor 38 which delivers the signal in a conventional manner. This moves the moving core 220, the plunger 224 and the piston 210 to the left whereby the hitherto established communication between the passages 243 and 246 is closed while the hydraulic communication between the passages 243 and 247 is now completed. Thus the passage 241 communicates now with the chamber 129 of the skid control device 100 via the hydraulic line 242, 243, 247, 245, 250, 232 and 28 so that the hydraulic flow through said line will be more throttled at the orifice 250.

In addition, in case the hydraulic pressure is not stored in the accumulator 23 and, therefore the pressurized hydraulic fluid is not transmitted into the chambers 129 and 131 of the skid control device 100, the plunger 149 is shifted to the right by the biasing force of the spring 135 through the piston 132. Thus, the valve member 163 is held in its open position, so that the normal brake operation can be obtained.

Figure 4:
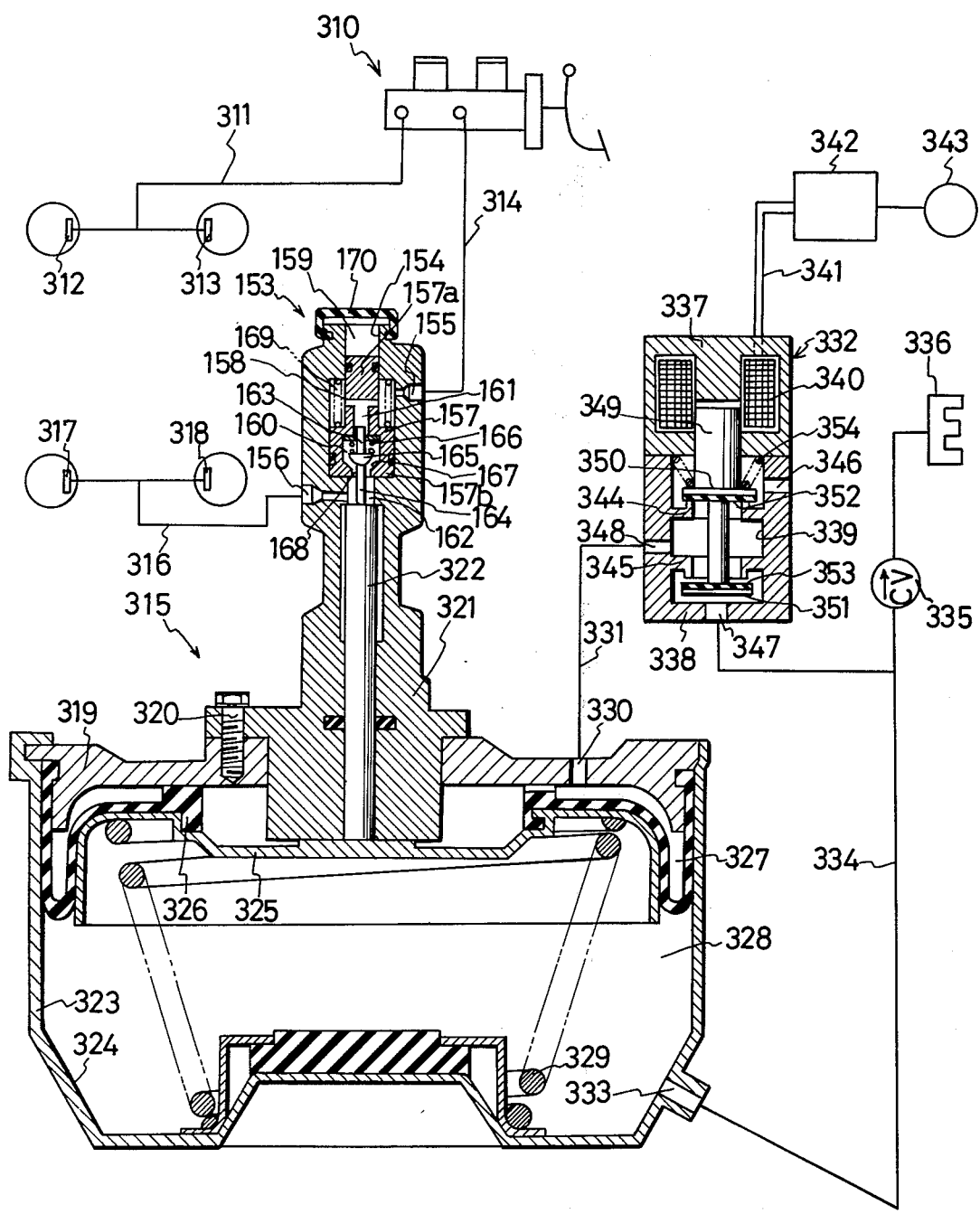
FIG. 4 is a view similar to FIG. 1, but showing another embodiment of the present invention.

In FIG. 4, a second enbodiment of the present invention is illustrated. A master cylinder 310 of the dual pressure chamber type has its front chamber connected through a conduit 311 to cylinders 312 and 313 of the brakes on the front wheels. The rear chamber of the master cylinder 310 is in hydraulic communication via a conduit 314 with a pressure control valve device 153. This pressure control valve device 153 will be substantially constructed as the same as in FIG. 1, and therefore, the corresponding parts will be shown by same reference numerals. The pressure control valve device 153 is in turn connected by a conduit 316 to rear wheel brakes 317 and 318.

A skid control device 315 includes a first section 319 fixed by bolt means 320 to a housing 321 and a second section secured to the first section 319 thereby defining a bore 324. A piston 325 is positioned within the bore 324 and cooperates with a diaphragm 326 to provide a power wall which divides the bore 324 into a first pneumatic chamber 327 and a second pneumatic chamber 328. A spring 329 is contained in the second pneumatic chamber 328 and biases the piston 325 and the diaphragm 326 in a direction tending to decrease the volume of the first pneumatic chamber 327. Thus a plunger 322 slidable in the housing 321 is urged in an inoperative rest position, as shown in FIG. 4, in which an upper end of the plunger 322 contacts the stem 164 of the valve member 163 so that the valve member 163 is in a given position as shown in FIG. 4.

The first section 319 is provided with a hole 330 which is pneumatically connected by a conduit 331 to an electromagnetic change over valve means 332 while the second section 323 is provided with a vacuum supply inlet hole 333 for connecting the second pneumatic chamber 328 by a conduit 334 and a check valve 335 to a suitable vacuum source such as an engine intake manifold 336.

The electromagnetic change over valve means 332 includes an upper section 337, a lower section 338 fixed to the upper section 337, and a through bore 339. A solenoid 340 is mounted in the upper section 337 and is electrically connected at 341 to a conventional computer 342 which receives an instructive signal from conventional wheel-skid sensor means 343. The lower section 338 of the change over valve means 332 includes a pair of inwardly extending annular projections 344 and 345, an atmospheric air inlet 346, a vacuum inlet 347 and an outlet 348. A displaceable piston 349 is mounted in the bore 59, the piston 349 comprising a pair of annular shoulders 350 and 351 and a pair of rubber members 352 and 353 secured to the shoulders 350 and 351 for seating against the radial projections 344 and 345 respectively. A coil spring 354 is inserted between the upper shoulder 350 and the upper section 337 for biasing the piston 349 to move downward as viewed in FIG. 4. In the normal condition, the upper rubber 352 is seated against the upper radial projection 344 while the lower rubber 353 is unseated from the lower radial projection 345. The outlet 348 of the change over valve means 332 is connected through the conduit 331 to the hole 330 of the skid control device 315 while the vacuum inlet 347 thereof is connected through a branch conduit of the conduit 334 to the intake manifold 336 via the check valve 335.

In the normal condition of brake operation wherein the computer 342 generates no instructive signal, the position of the various elements of the brake system is shown in FIG. 4. Thus the first and second pneumatic chambers 327 and 328 are at vacuum supply pressure and the spring 329 holds the plunger 322 in its upward position so that it positively urges the valve member 163 to hold the latter in its unseated position. Therefore the hydraulic pressure generated in the rear chamber of the dual master cylinder 310 is communicated to the cylinders 317 and 318 of the rear wheel brakes via the conduit 314, the pressure control valve device 153 and the conduit 316. The pressure control valve device 153 operates to maintain substantially the same proportional relationship between inlet and outlet pressures as that described in FIG. 1. Namely, the input and output fluid pressures $P_1$ and $P_2$ at the inlet port 155 and the outlet port 156 of the pressure control valve device 153 are initially equal to each other untill the input and output pressures attain a predetermined value.

When the input and output pressures attain the predetermined value, the force acting on the effective surface area $S_1$ of the larger diameter portion 157b of the piston 157 subjected to the outlet pressure $P_1$ overcomes the force acting on the difference area $(S_1-S_2)$ between the larger and smaller diameter portions 157b and 157a of the piston 157 subjected to the input pressure $P_2$ plus associated by the spring force 169. Thus the piston 157 is moved upwardly, as viewed in FIG. 4, so that the valve seat 167 of the piston 157 seats with the valve head 167 to close the passage 168. Thereafter, the input pressure is further increased and the increased pressure will act on the piston 157 against the force keeping the valve closed whereby the piston 157 will be moved downwardly to reopen the passage 168. Thus closing and opening of the passage 168 is repeated and therefore the output pressure increases at a lower rate than the input pressure.

When the computer 342 generates the instructive signal that the brake pressure to wheel brakes 317 and 318 should be relieved, the solenoid 340 is energized thereby causing the piston 349 to move upwards against the atmospheric pressure on the upper shoulder 350 and the biasing force of the spring 354. Therefore, the rubber 352 is unseated from the upper radial projection 344 whilst the rubber 353 is seated against the lower radial projection 345 so that air at atmospheric pressure is admitted to the first chamber 327. A pressure difference is thus generated between the first and second chambers 327 and 328 thereby causing the diaphragm piston 325, 326 to move downwards against the biasing force of the spring 329. The plunger 322 and the valve member 163 follow the downward movement of the diaphragm pistons 325, 326 due to the hydraulic pressure in the chamber 164 and the pressure of the spring 166. After a predetermined downward movement of the plunger 322, the valve head 165 is seated against the valve seat 167 of the piston 157 thereby interrupting the fluid pressure communication between the chambers 158 and 164. Therefore, even when the master cylinder pressure exceeds the predetermined value, the valve member 163 is held in its closed position in which the piston 157 is held in its extreme downward position, as viewed in FIG. 4 and thus the pressure control valve device 153 ceases its function. Further downward movement of the plunger 322 is accompanied due to the hydraulic pressure in the chamber 164. The volume of the chamber 164 increases in accordance with the downward movement of the plunger 322 thereby reducing the hydraulic pressure in the cylinders 317 and 318 of the rear wheel brakes.

When the skid instructive signal is discontinued, the change over valve means 322 returns to its normal condition as shown in FIG. 4 so that the elements of the skid control device 315 resume their original positions. Thus normal brake operation will be attained. Any skid instructive signal subsequently generated by the sensor 343 will cause a repeat of the aforesaid movement of the elements of the skid control device 315. Thus, the hydraulic pressure releasing and applying movement from and to the rear wheel brakes can be repeated.

Various other modifications and variations of the present invention are obviously possible in light of the above teachings. It is to be understood, therefore, that within the scope of the appended claims, the invention may be practiced otherwise than as specifically described herein.

What is claimed is:

1. A brake actuating hydraulic pressure control system for a vehicle comprising;

a master cylinder, a wheel cylinder of at least one wheel of the vehicle, a hydraulic circuit communicating said cylinders, a pressure control valve device disposed within said circuit for controlling the relative hydraulic pressure supplied to said wheel cylinder after the master cylinder pressure exceeds a predetermined value, said pressure control valve device including a housing having a bore, a stepped piston slidably mounted within said bore and having a first effective area portion exposed to the master cylinder pressure to urge said piston in one direction and said piston having a second portion of a greater effective area than that of said first portion, said second portion being exposed to the hydraulic pressure in said wheel cylinder to move said piston in opposition to the master cylinder pressure, a spring means for biasing said piston in said one direction, and a valve member for on-off controlling said hydraulic circuit in response to the movement of said piston, means for sensing a substantial wheel skidding condition and delivering an instructive signal as a result of the sensing, a change-over valve means movable in response to said instructive signal, a skid control device for relieving the hydraulic pressure of the brake in said wheel cylinder through said change-over valve means, and said skid control device including a plunger movable within said hydraulic circuit and operatively contacted with said valve member of said pressure control valve device and said plunger has a portion which normally holds said valve member of said pressure control valve device in the open position, whereby under skid condition said valve member is closed and said stepped piston is contacted with said housing in response to the movement of said plunger so as to interrupt the hydraulic communication between said master cylinder and said wheel cylinder, and the effective volume of said hydraulic circuit between said valve member and said wheel cylinder is varied in response to the movement of said plunger and a control piston operatively connected with said plunger for effecting the movement of said plunger through said change-over valve means to reduce the brake pressure.

2. A system as set forth in claim 1, wherein said stepped piston comprises a large diameter portion having said second portion at its one end and a small diameter portion exposed to the atmospheric pressure.

3. A system as set forth in claim 1, wherein said stepped piston is formed with a passage means which is formed as a part of said hydraulic circuit and said valve member is interposed within said passage means, said valve member comprising a valve head which cooperates with a seat portion of said stepped piston and a stem portion which normally contact with said plunger, and said valve head being urged by a further spring in its closing direction.

4. A system as set forth in claim 1, further comprising a vehicle engine operated pump means for providing a source means of pressurized hydraulic fluid, and said skid control device includes a cylinder fixed to a main body so as to slidably accommodate said control piston therein and a hydraulic chamber defined by said control piston within said cylinder and communicable with said source means through said change-over valve means.

5. A system as set forth in claim 4 further comprising an emergency piston normally urged into its rest position by the pressurized hydraulic fluid, a supplementary piston arranged between said control piston and said plunger and a spring biasing said emergency and supplementary pistons toward said plunger upon failure of said source means of pressure so that said valve member of said pressure control valve device is urged to its open position.

6. A system as set forth in claim 1, wherein said control piston is a spring biased diaphragm piston thereby defining first and second chambers within a main body, said first chamber being connected to said change-over valve means and said second chamber being connected to a vacuum source, and said change-over valve means is associated with the atmosphere and the vacuum source for controlling the flow of the atmospheric air and vacuum.

* * * * *